(12) United States Patent
Yanagisawa et al.

(10) Patent No.: US 8,197,923 B2
(45) Date of Patent: Jun. 12, 2012

(54) OPTICAL RECORDING MEDIUM

(75) Inventors: Satoshi Yanagisawa, Tokyo (JP); Yusuke Kubota, Tokyo (JP)

(73) Assignee: Adeka Corporation, Tokyo (JP)

( * ) Notice: Subject to any disclaimer, the term of this patent is extended or adjusted under 35 U.S.C. 154(b) by 904 days.

(21) Appl. No.: 12/161,601

(22) PCT Filed: Feb. 19, 2007

(86) PCT No.: PCT/JP2007/052964
§ 371 (c)(1),
(2), (4) Date: Jul. 21, 2008

(87) PCT Pub. No.: WO2007/105416
PCT Pub. Date: Sep. 20, 2007

(65) Prior Publication Data
US 2009/0029088 A1      Jan. 29, 2009

(30) Foreign Application Priority Data
Mar. 14, 2006  (JP) ................ 2006-069137

(51) Int. Cl.
B32B 3/02 (2006.01)
G11B 7/24 (2006.01)

(52) U.S. Cl. ............. 428/64.8; 428/64.4; 430/270.18; 430/270.19; G9B/7.15

(58) Field of Classification Search ............ 428/64.4, 428/64.8; 430/270.18, 270.19; G9B/7.15
See application file for complete search history.

(56) References Cited

U.S. PATENT DOCUMENTS

| | | | |
|---|---|---|---|
| 3,933,510 A * | 1/1976 | Shiba et al. ............ | 430/574 |
| 4,050,938 A * | 9/1977 | Smith et al. ............ | 430/170 |
| 4,735,889 A * | 4/1988 | Namba et al. ........... | 430/270.16 |
| 5,512,416 A * | 4/1996 | Namba et al. ........... | 430/270.21 |
| 6,482,494 B2 | 11/2002 | Je et al. | |
| 7,247,417 B2 | 7/2007 | Fukuzawa et al. | |
| 7,598,360 B2 * | 10/2009 | Wang et al. ............ | 534/702 |
| 7,683,184 B2 * | 3/2010 | Yanagisawa et al. ..... | 548/561 |
| 7,799,927 B2 * | 9/2010 | Wang et al. ............ | 548/120 |
| 2002/0006494 A1 * | 1/2002 | Saito et al. ............ | 428/64.4 |
| 2007/0009825 A1 * | 1/2007 | Wang et al. ............ | 430/141 |

FOREIGN PATENT DOCUMENTS

| | | |
|---|---|---|
| EP | 0 919 998 | 6/1999 |
| EP | 1 795 525 | 6/2007 |
| GB | 972001 a * | 10/1964 |
| JP | 59081194 A * | 5/1984 |
| JP | 2001-301333 | 10/2001 |
| JP | 2001-342365 | 12/2001 |
| JP | 2002-229195 | 8/2002 |
| JP | 2003171571 A * | 6/2003 |
| JP | 2003-237236 | 8/2003 |
| JP | 2003-335061 | 11/2003 |
| JP | 2004-98542 | 4/2004 |
| JP | 2004-195765 | 7/2004 |
| JP | 2007-030505 | 2/2007 |
| WO | WO 2006137580 A1 * | 12/2006 |

OTHER PUBLICATIONS

Machine translation of detailed description of JP 2003-171571 acquired on May 13, 2011.*
European Search Report—EP 07 71 4490—Oct. 5, 2010.
European Search Report—EP 11 00 4043—Jun. 29, 2011.
European Search Report—EP 11 00 4044—Jun. 30, 2011.

* cited by examiner

*Primary Examiner* — Gerard Higgins
(74) *Attorney, Agent, or Firm* — Young & Thompson

(57) ABSTRACT

An optical recording medium having a substrate and an optical recording layer on the substrate. The optical recording layer is formed of an optical recording material containing at least one heterocyclic compound represented by

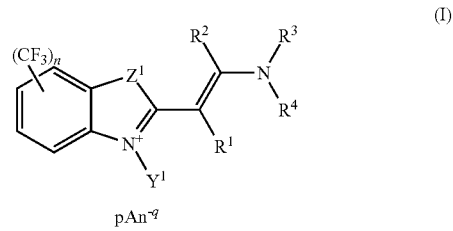

general formula (I):
wherein $Z^1$ represents oxygen, sulfur, $—CR^5R^6—$, etc. ($R^5$ and $R^6$ are each a substituent, e.g., an alkyl group or an aralkyl group, or are taken together to form a ring); $R^1$ and $R^2$ each represent hydrogen, etc.; $R^3$ and $R^4$ each represent an alkyl group having 1 to 8 carbon atoms or are taken together to form a heterocyclic ring having no multiple bond; $Y^1$ represents a hydrogen atom, an alkyl group having 1 to 8 carbon atoms, a metallocene substituent, etc.; $An^{q-}$ represents a q-valent anion; q represents 1 or 2; p represents a number necessary to neutralize an electric charge; and n represents a number of 1 to 4.

8 Claims, No Drawings

OPTICAL RECORDING MEDIUM

TECHNICAL FIELD

This invention relates to an optical recording medium on which information can be written as an information pattern with a laser beam, etc. More particularly, it relates to an optical recording medium capable of high-density optical writing and reading using a low energy laser having a wavelength in the visible to ultraviolet region.

BACKGROUND ART

Optical recording media have spread widely generally because of their superiority such as high recording capacity and non-contact write/read system. Recordable optical disks such as WORMs, CD-Rs, and DVD±Rs record information by irradiating a very small area of the optical recording layer with a focused laser beam to change the properties of the irradiated area and reproduce the recorded information making use of the difference in reflected light quantity between the recorded area and the non-recorded area.

Wavelengths of semiconductor lasers used in writing and reading information on the currently available optical disks of the type described are in the ranges of 750 to 830 nm for CD-Rs and of 620 to 690 nm for DVD-Rs. In pursuit of a further increased capacity, optical disks using shorter wavelength lasers have been under study. For example, those using a write wavelength of 380 to 420 nm have been studied.

Optical recording media for short wavelength writing light that have been proposed to date include those containing a cyanine compound having a specific structure disclosed in Patent Document 1, those containing a hemicyanine dye disclosed in Patent Document 2, and those containing a trimethine cyanine dye described in Patent Document 3. These compounds, however, are not always good for use in an optical recording medium for shorter wavelength recording in view of their absorption wavelength characteristics or insufficient solubility or light resistance.

Patent Document 1:JP 2001-301333A
Patent Document 2: JP 2001-342365A
Patent Document 3:JP 2004-98542A

DISCLOSURE OF THE INVENTION

Problem to be Solved by the Invention

An object of the invention is to provide a light-resistant optical recording medium for short wavelength writing light.

Means for Solving the Problem

As a result of extensive investigations, the present inventors have found that a heterocyclic compound having a specific molecular structure has absorption wavelength characteristics suited for use in an optical recording medium for short wavelength writing light and that use of the compound provides a solution to the above problem.

The present invention has been completed based on the above findings, achieving the above object by the provision of an optical recording medium having a substrate and an optical recording layer provided on the substrate. The optical recording layer is formed of an optical recording material containing at least one heterocyclic compound represented by general formula (I):

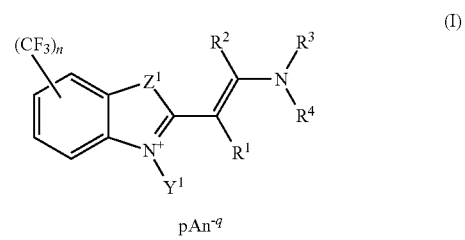

wherein $Z^1$ represents an oxygen atom, a sulfur atom, a selenium atom, —$CR^5R^6$—, —NH—, or —NR; $R^5$ and $R^6$ each independently represent an alkyl group having 1 to 8 carbon atoms, an aryl group having 6 to 20 carbon atoms, an aralkyl group having 7 to 20 carbon atoms, or a substituent represented by general formula (II) below, or $R^5$ and $R^6$ are taken together to form a ring; R represents a hydrogen atom, an alkyl group having 1 to 8 carbon atoms, an aryl group having 6 to 20 carbon atoms, or an aralkyl group having 7 to 20 carbon atoms; $R^1$ and $R^2$ each independently represent a hydrogen atom, a halogen atom, a cyano group, an alkyl group having 1 to 8 carbon atoms, or an aralkyl group having 7 to 20 carbon atoms; $R^3$ and $R^4$ each independently represent an alkyl group having 1 to 8 carbon atoms or an aryl group having 6 to 20 carbon atoms, or $R^3$ and $R^4$ are taken together to form a heterocyclic ring having no multiple bond; $Y^1$ represents a hydrogen atom, an alkyl group having 1 to 8 carbon atoms, an aryl group having 6 to 20 carbon atoms, or an aralkyl group having 7 to 20 carbon atoms; the alkyl group having 1 to 8 carbon atoms as represented by $R^1$, $R^2$, $R^3$, $R^4$, $R^5$, $R^6$, or R, the aryl group having 6 to 20 carbon atoms as represented by $R^3$, $R^4$, $R^5$, $R^6$, R, or $Y^1$, and the aralkyl group having 7 to 20 carbon atoms as represented by $R^1$, $R^2$, $R^5$, $R^6$, R, or $Y^1$ may have a substituent; the methylene moiety of the alkyl group having 1 to 8 carbon atoms may be replaced with —O— or —CH=CH—; $An^{q-}$ represents a q-valent anion; q represents 1 or 2; p represents a number necessary to neutralize an electric charge; and n represents a number of 1 to 4;

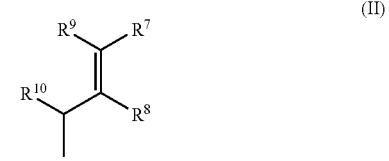

wherein $R^7$, $R^8$, $R^9$, and $R^{10}$ each independently represent a hydrogen atom, a halogen atom, or an alkyl group having 1 to 4 carbon atoms; the methylene moiety in the alkyl group may be replaced with —O— or —CO—; and $R^7$ and $R^8$ may be taken together to form a ring.

The invention also achieves the above object by the provision of an optical recording medium including a substrate and an optical recording layer on the substrate. The optical recording layer is formed of an optical recording material containing at least one heterocyclic compound represented by general formula (III):

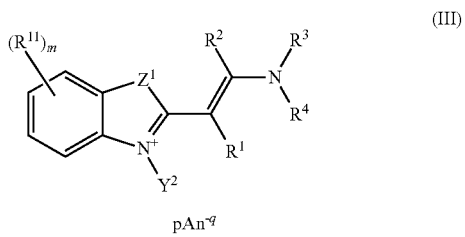

wherein $Z^1$, $R^1$, $R^2$, $R^3$, $R^4$, R, $An^{q-}$, q, and p are as defined for general formula (I); $R^{11}$ represents a hydrogen atom, an alkyl group having 1 to 8 carbon atoms, a halogen atom, a nitro group, a cyano group, or an amino group; adjacent $R^3$ and $R^4$ may be taken together to form a ring; $Y^2$ represents a substituent represented by general formula (IV); and m represents a number of 1 to 4;

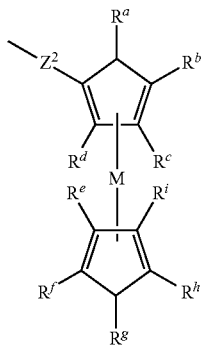

(IV)

wherein $R^a$, $R^b$, $R^c$, $R^d$, $R^e$, $R^f$, $R^g$, $R^h$, and $R^i$ each independently represent a hydrogen atom, a hydroxyl group, or an alkyl group having 1 to 4 carbon atoms a methylene moiety of which may be replaced with —O— or —CO—; $Z^2$ represents a single bond or a substituted or unsubstituted alkylene group having 1 to 8 carbon atoms a methylene moiety of which may be replaced with —O—, —S—, —CO—, —COO—, —OCO—, —SO$_2$—, —NH—, —CONH—, —NHCO—, —N=CH—, or —CH=CH—; and M represents a metal atom.

The invention also achieves the object by the provision of an optical recording medium including a substrate and an optical recording layer on the substrate. The optical recording layer is formed of an optical recording material containing at least one heterocyclic compound represented by general formula (V):

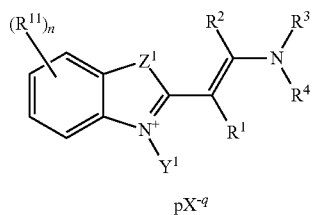

(V)

wherein $Z^1$, $R^1$, $R^2$, $R^3$, $R^4$, R, $Y^1$, q, p, and n are as defined for general formula (I); $R^{11}$ is as defined for general formula (III); and X represents a q-valent quencher anion.

BEST MODE FOR CARRYING OUT THE INVENTION

The optical recording medium of the present invention will be described in detail based on its preferred embodiments.

In general formula (I) representing the heterocyclic compound of the invention, examples of the alkyl group having 1 to 8 carbon atoms as represented by $R^1$, $R^2$, $R^3$, and $R^4$, and $R^5$, $R^6$, and R in $Z^1$ include methyl, ethyl, propyl, isopropyl, butyl, sec-butyl, tert-butyl, isobutyl, amyl, isoamyl, tert-amyl, hexyl, cyclohexyl, cyclohexylmethyl, cyclohexylethyl, heptyl, isoheptyl, tert-heptyl, n-octyl, isooctyl, tert-octyl, and 2-ethylhexyl. Examples of the aryl group having 6 to 20 carbon atoms as represented by $R^3$, $R^4$, and $Y^1$, and $R^5$, $R^6$, and R in $Z^1$ include phenyl, naphthyl, anthracen-1-yl, and phenanthren-1-yl. Examples of the aralkyl group having 7 to 20 carbon atoms as represented by $R^1$, $R^2$, and Y, and $R^4$, $R^5$, and R in $Z^1$ include benzyl, phenethyl, 2-phenylpropane, diphenylmethyl, triphenylmethyl, styryl, and cinnamyl.

The halogen atom as represented by $R^1$ and $R^2$ in general formula (I) and $R^{11}$ in general formulae (III) and (V) is exemplified by fluorine, chlorine, bromine and iodine.

Examples of the ring structure formed by the combination of $R^5$ and $R^6$ in $Z^1$ of general formula (I) include a cyclopropane, a cyclobutane, a cyclopentane, a cyclohexane, a tetrahydropyran, a piperidine, a piperazine, a pyrrolidine, a morpholine, a thiomorpholine, a pyridine, a pyrazine, a pyrimidine, a pyridazine, a triazine, a quinoline, an isoquinoline, an imidazole, an oxazole, an imidazolidine, a pyrazolidine, a thiazolidine, an isothiazolidine, an oxazolidine, and an isoxazolidine ring. The rings recited may be fused to other ring(s) or may have a substituent.

Examples of the heterocyclic ring having no multiple bond as formed by linking $R^3$ and $R^4$ in general formula (I) include a pyrrolidine, an imidazolidine, a pyrazolidine, a thiazolidine, an isothiazolidine, an oxazolidine, an isoxazolidine, a piperidine, a piperazine, and a morpholine ring.

The alkyl group having 1 to 8 carbon atoms as represented by $R^1$, $R^2$, $R^3$, $R^4$, $R^5$, $R^6$, or R, the aryl group having 6 to 20 carbon atoms as represented by $R^3$, $R^4$, $R^5$, $R^6$, R, or $Y^1$, and the aralkyl group having 7 to 20 carbon atoms as represented by $R^1$, $R^2$, $R^5$, $R^6$, R, or $Y^1$ may have a substituent. A methylene moiety of the alkyl group having 1 to 8 carbon atoms may be replaced with —O— or —CH=CH—. Examples of the substituent are described below. When any of $R^1$, $R^2$, $R^3$, $R^4$, $R^5$, and R is a carbon-containing group such as the alkyl group having 1 to 8 carbon atoms, and the carbon-containing group has a carbon-containing substituent such as described below, the total number of carbon atoms of the group inclusive of the substituent should fall within the range recited for the respective group.

Examples of the substituent are: alkyl groups such as methyl, ethyl, propyl, isopropyl, cyclopropyl, butyl, sec-butyl, tert-butyl, isobutyl, amyl, isoamyl, tert-amyl, cyclopentyl, hexyl, 2-hexyl, 3-hexyl, cyclohexyl, bicyclohexyl, 1-methylcyclohexyl, heptyl, 2-heptyl, 3-heptyl, isoheptyl, tert-heptyl, n-octyl, isooctyl, tert-octyl, 2-ethylhexyl, nonyl, isononyl, and decyl; alkoxy groups such as methoxy, ethoxy, propoxy, isopropoxy, butoxy, sec-butoxy, tert-butoxy, isobutoxy, amyloxy, isoamyloxy, tert-amyloxy, hexyloxy, cyclohexyloxy, heptyloxy, isoheptyloxy, tert-heptyloxy, n-octyloxy, isooctyloxy, tert-octyloxy, 2-ethylhexyloxy, nonyloxy, and decyloxy; alkylthio groups such as methylthio, ethylthio, propylthio, isopropylthio, butylthio, sec-butylthio, tert-butylthio, isobutylthio, amylthio, isoamylthio, tert-amylthio, hexylthio, cyclohexylthio, heptylthio, isoheptylthio, tert-heptylthio, n-octylthio, isooctylthio, tert-octylthio, and 2-ethylhexylthio; alkenyl groups such as vinyl, 1-methylethenyl, 2-methylethenyl, 2-propenyl, 1-methyl-3-propenyl, 3-butenyl, 1-methyl-3-butenyl, isobutenyl, 3-pentenyl, 4-hexenyl, cyclohexenyl, bicyclohexenyl, heptenyl, octenyl, decenyl, pentadecenyl, eicosenyl, and tricosenyl; aralkyl groups such as benzyl, phenethyl, diphenylmethyl, triphenylmethyl, styryl, and cinnamyl; aryl groups such as phenyl and naphthyl; aryloxy groups such as phenoxy and naphthoxy; arylthio groups such as phenylthio and naphthylthio; heterocyclic groups such as pyridyl, pyrimidyl, pyridazyl, piperidyl, pyranyl, pyrazolyl, triazyl, pyrrolyl, quinolyl, isoquinolyl, imidazolyl, benzimidazolyl, triazolyl, furyl, furanyl, benzofuranyl, thienyl, thiophenyl, benzothiophenyl, thiadiazolyl, thiazolyl, benzothiazolyl, oxazolyl, benzoxazolyl, isothiazolyl, isoxazolyl, indolyl, 2-pyrrolidinon-1-yl, 2-piperidon-1-yl, 2,4-dioxyimidazolidin-3-yl, and 2,4-dioxyoxazolidin-3-yl; halogen atoms such as fluorine, chlorine, bromine, and iodine; acyl groups such as acetyl, 2-chloroacetyl, propionyl, octanoyl, acryloyl, methacryloyl, phenylcarbonyl (benzoyl), phthaloyl, 4-trifluoromethylbenzoyl, pivaloyl, salicyloyl, oxaloyl, stearoyl, methoxycarbonyl, ethoxycarbonyl, t-butoxycarbonyl, n-octadecyloxycarbonyl, and carbamoyl; acyloxy groups such as acetyloxy and benzoyloxy; an amino group; substituted amino groups such as ethylamino, dimethylamino, diethylamine, butylamino, cyclopentylamino, 2-ethylhexylamino, dodecylamino, anilino, chlorophenylamino, toluidino, anisidino, N-methyl-anilino, diphenylamino, naphthylamino, 2-pyridylamino, methoxycarbonylamino, phenoxycarbonylamino, acetylamino, benzoylamino, formylamino, pivaloylamino, lauroylamino, carbamoylamino, N,N-dimethylaminocarbonylamino, N,N-diethylaminocarbonylamino, morpholinocarbonylamino, methoxycarbonylamino, ethoxycarbonylamino, t-butoxycarbonylamino, n-octadecyloxycarbonylamino, N-methyl-methoxycarbonylamino, phenoxycarbonylamino, sulfamoylamino, N,N-dimethylaminosulfonylamino, methylsulfonylamino, butylsulfonylamino, and phenylsulfonylamino, a sulfonamide group, a sulfonyl group, a carboxyl group, a cyano group, a sulfo group, a hydroxyl group, a nitro group, a mercapto group, an imide group, a carbamoyl group, and a sulfonamido group. These substituents may further be substituted. The carboxyl group and the sulfo group may form a salt.

In the general formula (I), examples of the anion as represented by $An^{q-}$ which is monovalent include halide anions such as a chloride, a bromide, an iodide, and a fluoride ion; inorganic anions such as a perchlorate, a chlorate, a thiocyanate, a hexafluorophosphate, a hexafluoroantimonate, and a tetrafluoroborate anion; organic sulfonate anions such as a benzenesulfonate, a toluenesulfonate, a trifluoromethanesulfonate, a diphenylamine-4-sulfonate, and a 2-amino-4-methyl-5-chlorbenzenesulfonate anion, 2-amino-4-methyl-5-nitorobenzenesulfonate anion, and a sulfonate anion described in JP 2004-53799A; organic phosphate anions such as an octylphosphate, a dodecylphosphate, octadecylphosphate, a phenylphosphate, a nonylphosphate, a 2,2'-methylenebis(4,6-di-tert-butylphenyl)phosphate anion; a bis(trifluoromethylsulfonyl)imide anion, a bis(perfluorobutanesulfonyl)imide anion, a perfluoro-4-ethylcyclohexanesulfonate anion, and a tetrakis(pentafluorophenyl)borate anion. Examples of the anion $An^{q-}$ which is divalent include a benzenedisulfonate and a naphthalenedisulfonate anion. If desired, a quencher anion capable of deexciting (quenching) an active molecule in an excited state, a metallocene compound anion of, for example, a ferrocene or a ruthenocene compound having an anionic group (e.g., a carboxyl group, a phosphonic acid group, or a sulfonic acid group) on its cyclopentadienyl ring can be used.

Examples of the quencher anion include anions represented by general formulae (A) and (B) and formula (C) shown below and those described in JP 60-234892A, JP 5-43814A, JP 5-305770A, JP 6-239028A, JP 9-309886A, JP 9-323478A, JP 10-45767A, JP 11-208118A, JP 2000-168237A, JP 2002-201373A, JP 2002-206061A, JP 2005-297407A, JP 7-96334B, and WO98/29257.

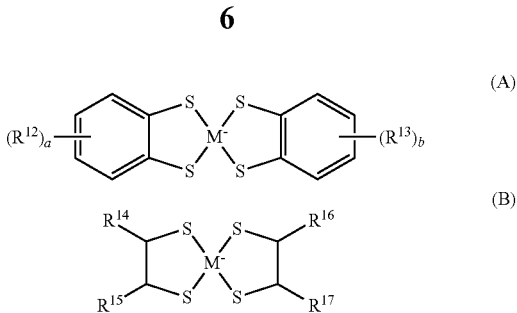

wherein M represents a nickel atom or a copper atom; $R^{12}$ and $R^{13}$ each represent a halogen atom, an alkyl group having 1 to 8 carbon atoms, an aryl group having 6 to 30 carbon atoms, or —$SO_2$-G; G represents an alkyl group, an aryl group, a halogen-substituted aryl group, a dialkylamino group, a diarylamino group, a piperidino group or a morpholino group; a and b each independently represent a number of 0 to 4; and $R^{14}$, $R^{15}$, $R^{16}$, and $R^{17}$ each independently represent an alkyl group, an alkylphenyl group, an alkoxyphenyl group or a halogen-substituted phenyl group.

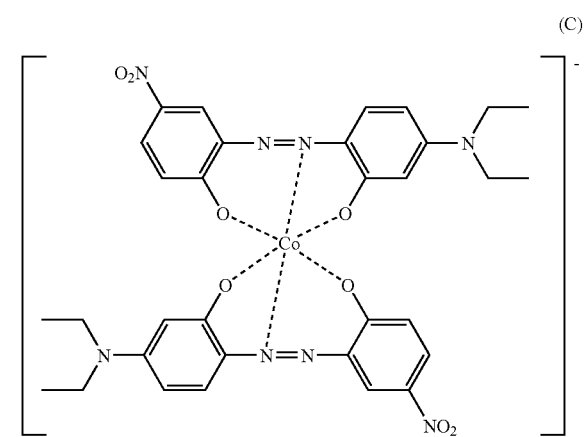

Examples of the alkyl group having 1 to 4 carbon atoms as represented by $R^7$, $R^8$, $R^9$, and $R^{10}$ in general formula (II) and $R^a$, $R^b$, $R^c$, $R^d$, $R^e$, $R^f$, $R^g$, $R^h$, and $R^i$ in general formula (IV) include methyl, ethyl, propyl, isopropyl, butyl, sec-butyl, tert-butyl, and isobutyl. Examples of the alkyl group a methylene moiety of which is replaced with —O— include methoxy, ethoxy, propoxy, isopropoxy, methoxymethyl, ethoxymethyl, and 2-methoxyethyl. Examples of the alkyl group a methylene moiety of which is replaced with —CO— include acetyl, 1-carbonylethyl, acetylmethyl, 1-carbonylpropyl, 2-oxobutyl, 2-acetylethyl, and 1-carbonylisopropyl. Examples of the alkyl group having 1 to 8 carbon atoms as represented by $R^{11}$ in general formula (III) include those recited with respect to general formula (I).

Examples of the halogen atom as represented by $R^7$, $R^8$, $R^9$, and $R^{10}$ in general formula (II) are fluorine, chlorine, bromine, and iodine. Examples of the cyclic structure formed by the combination of $R^7$ and $R^8$ include a cyclopropane, a cyclobutane, a cyclopentane, a cyclohexane, a tetrahydropyran, a piperidine, a piperazine, a pyrrolidine, a morpholine, a thiomorpholine, a pyridine, a pyrazine, a pyrimidine, a pyridazine, a triazine, a quinoline, an isoquinoline, an imidazole, an oxazole, an imidazolidine, a pyrazolidine, an isoxazolidine, and an isothiazolidine ring. The rings recited may be fused to other ring(s) or may have a substituent.

Examples of the substituted or unsubstituted alkylene group having 1 to 8 carbon atoms as represented by $Z^2$ in general formula (IV) include methylene, ethylene, propylene, methylethylene, butylene, 1-methylpropylene, 2-methylpropylene, 1,2-dimethylpropylene, 1,3-dimethylpropylene, 1-methylbutylene, 2-methylbutylene, 3-methylbutylene, 4-methylbutylene, 2,4-dimethylbutylene, 1,3-dimethylbutylene, pentylene, hexylene, heptylene, octylene, ethane-1,1-diyl, and propane-2,2-diyl. Examples of the alkylene group a methylene moiety of which is replaced with —O—, —S—, —CO—, —COO—, —OCO—, —SO$_2$—, —NH—, —CONH—, —NHCO—, —N=CH—, or —CH=CH— include methyleneoxy, ethyleneoxy, oxymethylene, thiomethylene, carbonylmethylene, carbonyloxymethylene, methylenecarbonyloxy, sulfonylmethylene, aminomethylene, acetylamino, ethylenecarboxyamide, ethaneimidoyl, ethenylene, and propenylene. Examples of the metal atom as represented by M include Fe, Co, Ni, Ti, Cu, Zn, Zr, Cr, Mo, Os, Mn, Ru, Sn, Pd, Rh, Pt, and Ir.

Of the heterocyclic compounds represented by general formula (I) those represented by general formula (VI) are preferred for low cost of production and their absorption wavelength characteristics suited for use in optical recording medium for short wavelength (380 to 420 nm) lasers.

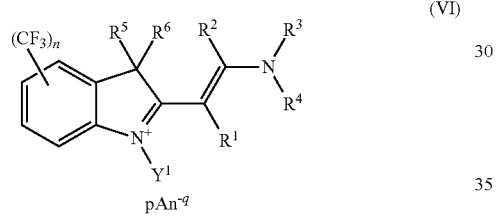

(VI)

wherein $R^1$, $R^2$, $R^3$, $R^4$, $R^5$, $R^6$, $Y^1$, $An^{q-}$, p, q, and n are as defined for general formula (I).

Of the heterocyclic compounds represented by general formula (III) those represented by general formula (VII) are preferred for low cost of production and their absorption wavelength characteristics suited for use in optical recording medium for short wavelength (380 to 420 nm) lasers.

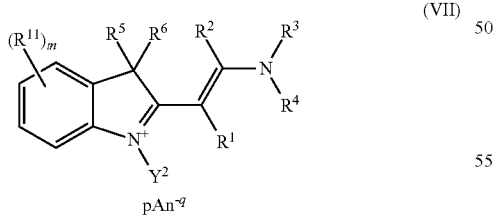

(VII)

wherein $R^1$, $R^2$, $R^3$, $R^4$, $R^5$, $R^6$, $An^{q-}$, p, and q are as defined for general formula (I); and $R^{11}$ and $Y^2$ are as defined for general formula (III).

Of the heterocyclic compounds represented by general formula (V) those represented by general formula (VIII) are preferred for low cost of production and their absorption wavelength characteristics suited for use in optical recording medium for short wavelength (380 to 420 nm) lasers.

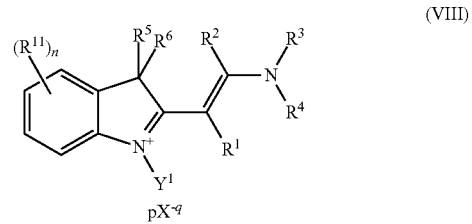

(VIII)

wherein $R^1$, $R^2$, $R^3$, $R^4$, $R^5$, $R^6$, $Y^1$, p, and q are as defined for general formula (I); $R^{11}$ is as defined for general formula (III); and X is as defined for general formula (V).

Examples of the heterocyclic compounds represented by general formulae (I), (III), and (V) include compound Nos. 1 to 18 shown below.

Compound No. 1

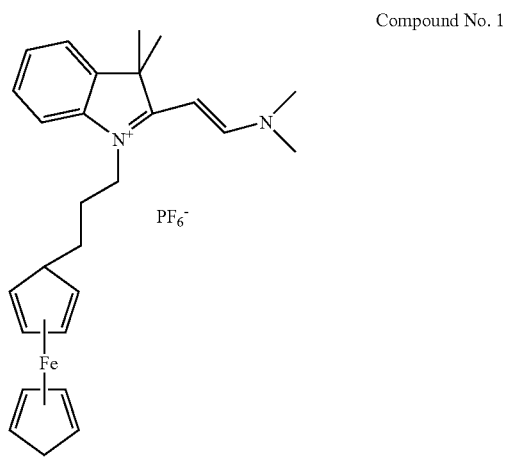

Compound No. 2

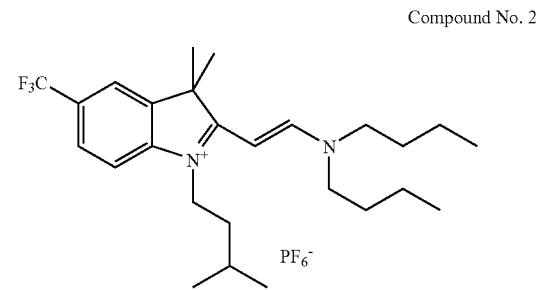

Compound No. 3

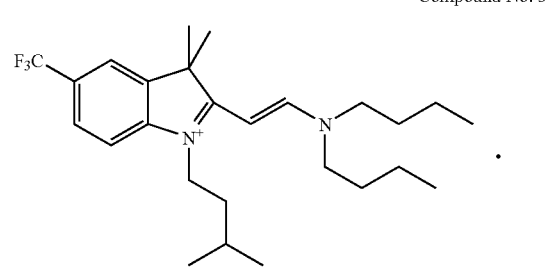

-continued
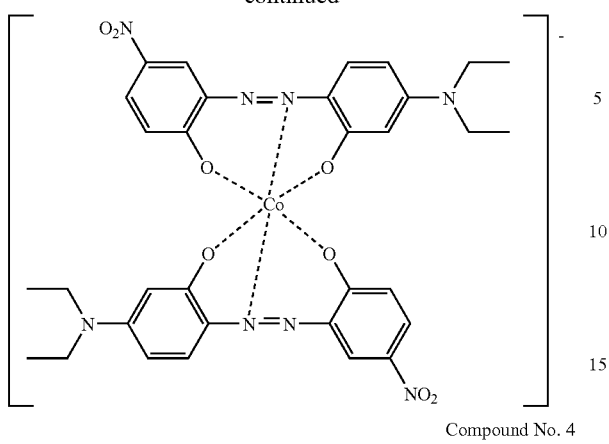
Compound No. 4
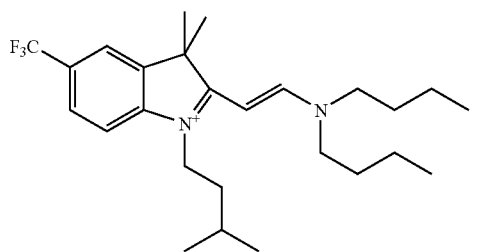
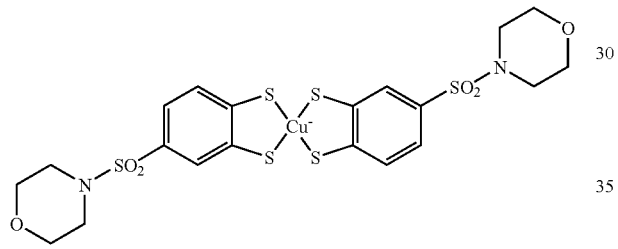
Compound No. 5
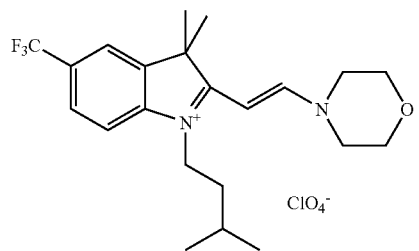
Compound No. 6
Compound No. 7
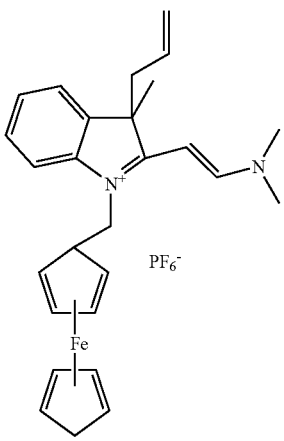
Compound No. 8
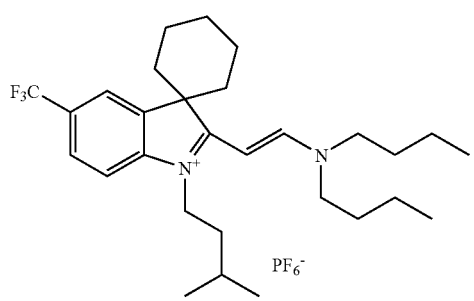
Compound No. 9
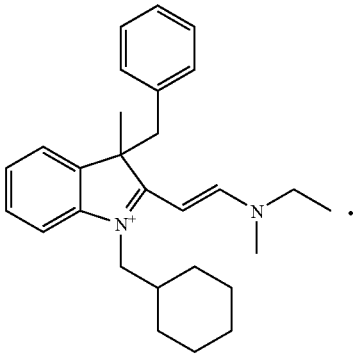
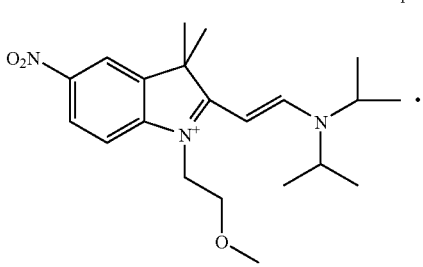
Compound No. 10
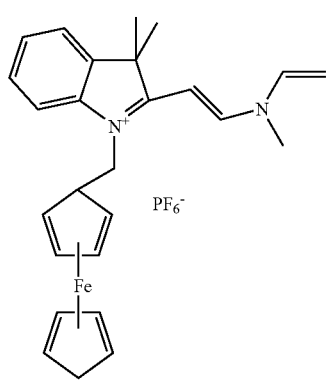

-continued
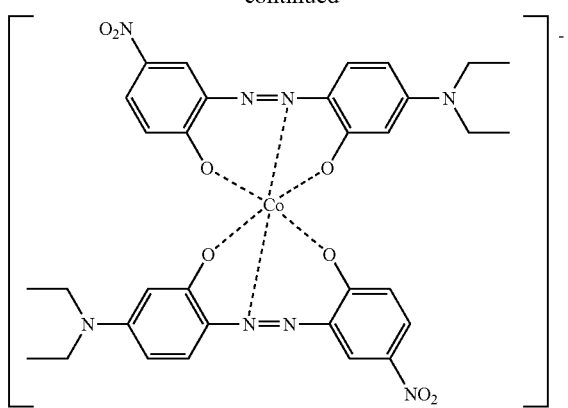
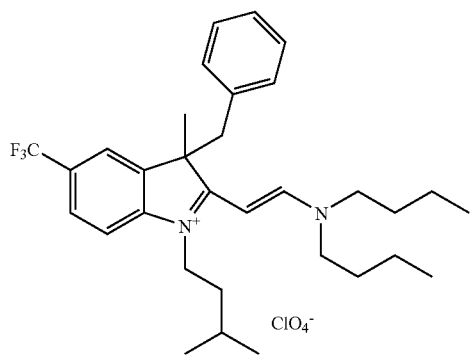
Compound No. 14
Compound No. 11
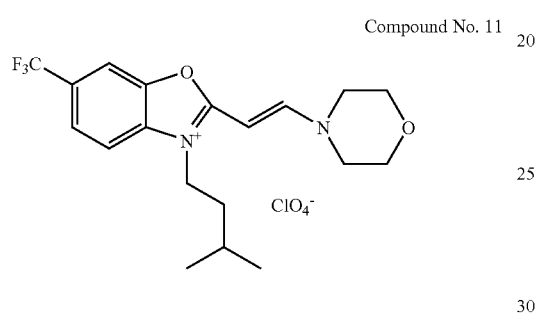
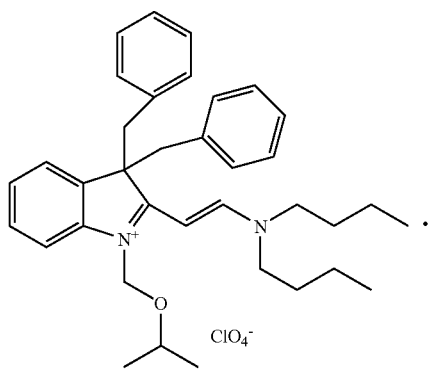
Compound No. 15
Compound No. 12
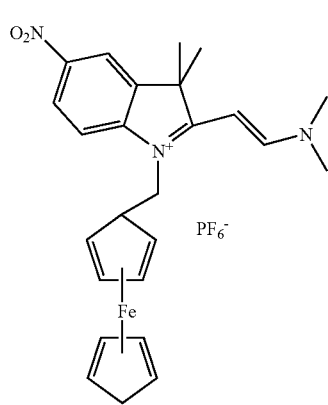
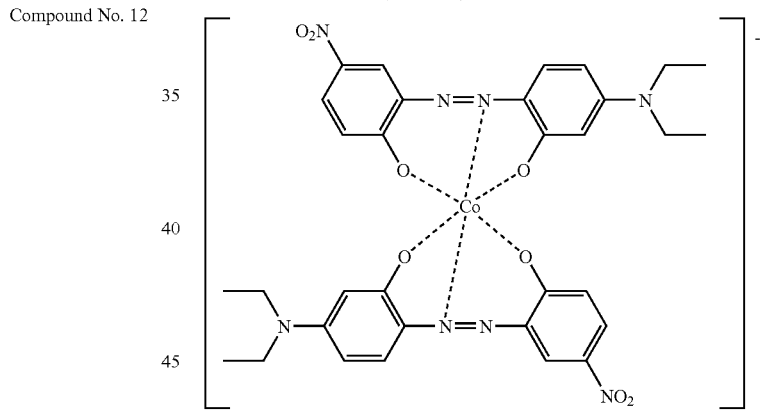
Compound No. 13
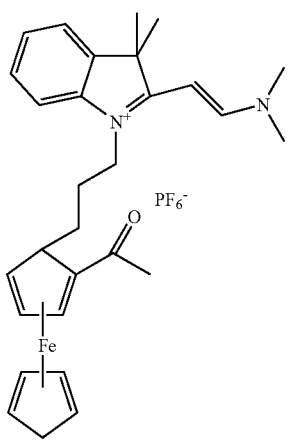
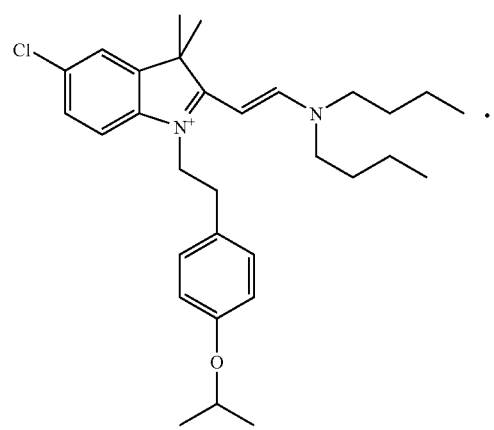
Compound No. 16

-continued

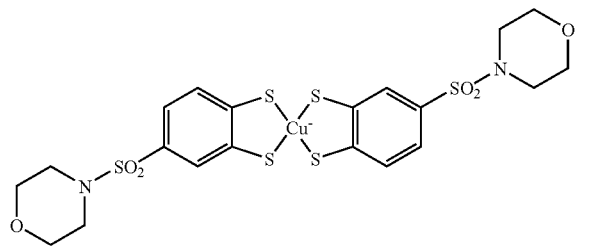

Compound No. 17

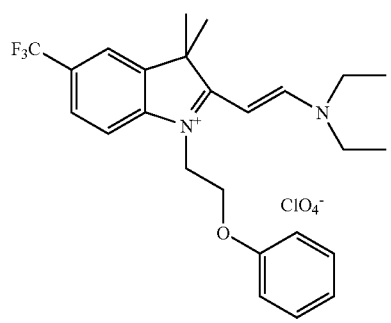

Compound No. 18

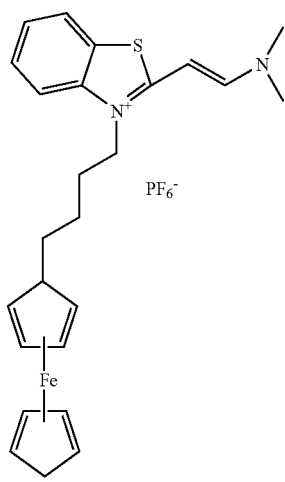

The heterocyclic compounds of formulae (I), (III), and (V) according to the invention are not restricted by the process of preparation. They can be obtained through processes making use of well-known reactions. For example, as shown in the following reaction scheme, the heterocyclic compound of formula (I) in which $R^2$ is hydrogen is synthesized by causing a 2-methyl heterocyclic derivative to react with a formamide derivative using a reactant such as phosphorus oxychloride. Where necessary, the product as obtained is subjected to anion exchange. The heterocyclic compounds of formulae (III) and (V) can be synthesized in the similar manner. The 2-methyl heterocyclic derivative and the formamide derivative can be obtained in a usual manner.

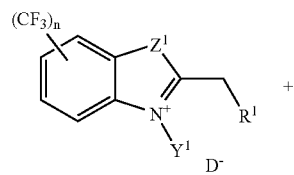

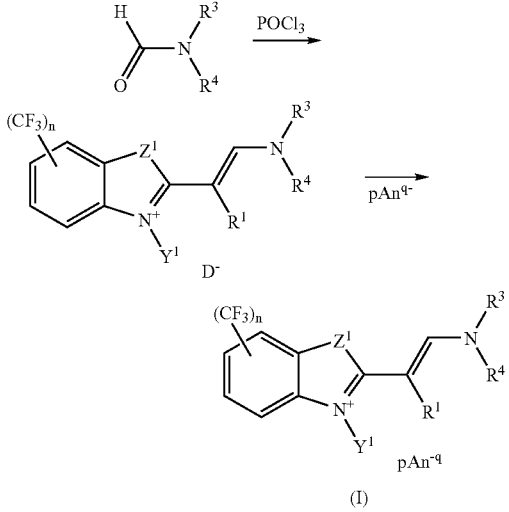

wherein $Z^1$, $R^1$, $R^3$, $R^4$, R, $Y^1$, q, p, and n are as defined for general formula (I); and D represents an anion.

The substituent $Y^1$ in the starting material used in the above reaction scheme is introduced using a compound $Y^1$-D (wherein D is a halogen group, e.g., chloro, bromo or iodo, a sulfonyloxy group, e.g., phenylsulfonyloxy, 4-methylsulfonyloxy or 4-chlorophenylsulfonyloxy, etc.) capable of reacting with the N—H group of the indole ring The optical recording medium of the invention is typically exemplified by a structure having a substrate and an optical recording layer provided on the substrate, in which the optical recording layer is formed of an optical recording material containing at least one of the heterocyclic compounds of formulae (I), (III), and (V). The structure may have other optional layers, such as a metal reflective layer, a protective layer, a primer layer, and a barrier layer.

The substrate that can be used in the optical recording medium of the invention is not particularly limited as long as it is substantially transparent to writing (recording) light and reading (reproducing) light and includes resins, such as polymethyl (meth)acrylate, poly(meth)acrylate, polycarbonate, amorphous polyolefins, polystyrene, polyester, polyamideimide, triacetyl cellulose, polyvinyl chloride, and epoxy resins; glass, ceramics, and metals. A resin or glass substrate having a sputtered film may also be used. The substrate can have an arbitrary form, including a film, a tape, a drum, a belt, and a disk. The substrate has a thickness of 0.1 to 2.0 mm, preferably 0.8 to 1.3 mm.

The optical recording layer formed from an optical recording material containing at least one of the heterocyclic compounds represented by formulae (I), (III), and (V) is a thin film capable of recording or rewriting information signals as an information pattern using a laser, etc. The thickness of the optical recording layer is usually 0.001 to 10 μm, preferably 0.01 to 5 μm.

The content of the heterocyclic compound in the optical recording material is preferably 0.1% to 10% by mass, more preferably 1.0% to 5.0% by mass.

The optical recording medium is produced by any known method. For example, an optical recording material is prepared by dissolving at least one of the heterocyclic compounds of formulae (I), (III), and (V) in an organic solvent (hereinafter described) together with an optional compound such as a quencher compound for singlet oxygen, etc., and the resulting solution is applied to a substrate by a wet coating technique such as spin coating, spraying or dipping to form the optical recording layer. The optical recording layer may also be formed by vacuum evaporation, sputtering, or a like technique.

Examples of suitable organic solvents include lower alcohols, such as methanol and ethanol; ether alcohols, such as methyl cellosolve, ethyl cellosolve, butyl cellosolve, and butyl diglycol; ketones, such as acetone, methyl ethyl ketone, methyl isobutyl ketone, cyclohexanone, and diacetone alcohol; esters, such as ethyl acetate, butyl acetate, and methoxyethyl acetate; acrylic esters, such as ethyl acrylate and butyl acrylate; fluoroalcohols, such as 2,2,3,3-tetrafluoropropanol; hydrocarbons, such as benzene, toluene, and xylene; and chlorinated hydrocarbons, such as methylene dichloride, dichloroethane, and chloroform. In the case where the organic solvent is used, the amount of the solvent to be used is preferably such that the resulting optical recording material (solution) contains 0.1% to 10% by mass of the heterocyclic compound.

Examples of the quencher compound that can be used if desired include diimmonium compounds, metal complexes, aromatic nitroso compounds, aluminum compounds, and immonium compounds.

The diimmonium compound is exemplified by a compound represented by general formula (IX):

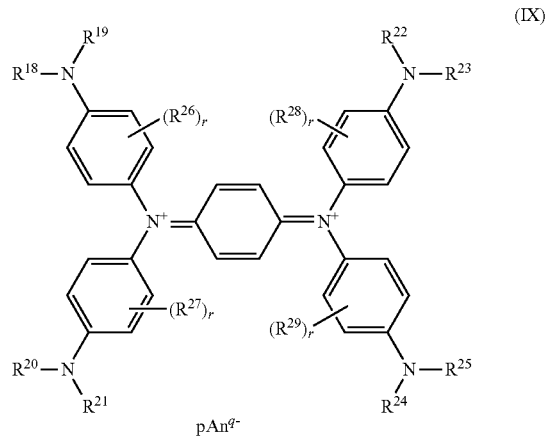

wherein $R^{18}$, $R^{19}$, $R^{20}$, $R^{21}$, $R^{22}$, $R^{23}$, $R^{24}$, and $R^{25}$ each independently represent a hydrogen atom or a substituted or unsubstituted alkyl group having 1 to 8 carbon atoms; $R^{26}$, $R^{27}$, $R^{28}$, and $R^{29}$ each independently represent a hydrogen atom, a halogen atom, a substituted or unsubstituted alkyl group having 1 to 8 carbon atoms, or a substituted or unsubstituted amino group; a methylene moiety of the alkyl group may be replaced with —O— or —CH=CH—; r represents a number of 1 to 4; and $An^{q-}$, p, and q are as defined for general formula (I).

In general formula (IX), the substituted or unsubstituted alkyl group having 1 to 8 carbon atoms as represented by $R^{18}$, $R^{19}$, $R^{20}$, $R^{21}$, $R^{22}$, $R^{23}$, $R^{24}$, $R^{25}$, $R^{26}$, $R^{27}$, $R^{28}$, and $R^{29}$ is exemplified by the same examples as recited for $R^1$, $R^2$, $R^3$, $R^4$, $R^5$, and $R^6$ in general formula (I). The halogen atom as represented by $R^{18}$, $R^{19}$, $R^{20}$, $R^{21}$, $R^{22}$, $R^{23}$, $R^{24}$ and $R^{25}$ is exemplified by the same examples as recited for $R^1$, $R^2$, etc. in general formula (I). Examples of the substituted or unsubstituted amino group as represented by $R^{18}$, $R^{19}$, $R^{20}$, $R^{21}$, $R^{22}$, $R^{23}$, $R^{24}$, and $R^{25}$ include amino, ethylamino, dimethylamino, diethylamine, butylamino, cyclopentylamino, 2-ethylhexylamino, dodecylamino, anilino, chlorophenylamino, toluidino, anisidino, N-methyl-anilino, diphenylamino, naphthylamino, 2-pyridylamino, methoxycarbonylamino, phenoxycarbonylamino, acetylamino, benzoylamino, formylamino, pivaloylamino, lauroylamino, carbamoylamino, N,N-dimethylaminocarbonylamino, N,N-diethylaminocarbonylamino, morpholinocarbonylamino, methoxycarbonylamino, ethoxycarbonylamino, t-butoxycarbonylamino, n-octadecyloxycarbonylamino, N-methyl-methoxycarbonylamino, phenoxycarbonylamino, sulfamoylamino, N,N-dimethylaminosulfonylamino, methylsulfonylamino, butylsulfonylamino, and phenylsulfonylamino.

The metal complex is exemplified by a compound represented by general formula (X):

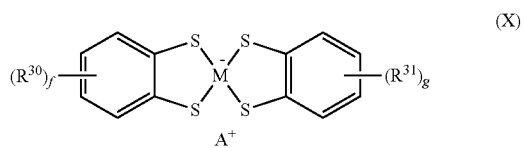

wherein M represents a nickel atom, a cobalt atom, or a copper atom; $R^{30}$ and $R^{31}$ each represent a halogen atom, an alkyl group having 1 to 8 carbon atoms, an aryl group having 6 to 30 carbon atoms, or —SO-G; G represents an alkyl group, a halogen-substituted or unsubstituted aryl group, a dialkylamino group, a diarylamino group, a piperidino group, or a morpholino group; and f and g each independently represent a number of 0 to 4.

The quencher compound, if used, is preferably added in an amount up to 99% by mass, more preferably 50% to 95% by mass, based on the solids content of the optical recording material.

If desired, the optical recording material can contain other various components including compounds commonly employed in an optical recording layer, such as azo compounds, phthalocyanine compounds, oxonol compounds, squarylium compounds, indole compounds, styryl compounds, porphin compounds, azulenium compounds, croconic methine compounds, pyrylium compounds, thiopyrylium compounds, triarylmethane compounds, diphenylmethane compounds, tetrahydrocholine compounds, indophenol compounds, anthraquinone compounds, naphthoquinone compounds, xanthene compounds, thiazine compounds, acridine compounds, oxazine compounds, spiropyran compounds, fluorene compounds, and rhodamine compounds; resins, such as polyethylene, polyester, polystyrene, and polycarbonate; surface active agents, antistatic agents, lubricants, flame retardants, radical scavengers (e.g., hindered amines), pit formation accelerators (e.g., ferrocene derivatives), dispersants, antioxidants, crosslinking agents, binders, light resistance imparting agents, ultraviolet absorbers, plasticizers, and so forth. These various components can each be present in the optical recording material in an amount of 0% to 50% by mass based on the solids content of the material.

The metal reflective layer that can be used in the optical recording medium of the invention is formed by vacuum evaporation or sputtering of gold, silver, aluminum, nickel, copper, an alloy of these metals, a silver compound, etc. If desired, a protective layer may be provided using a thermoplastic resin, a thermosetting resin, a light curing resin, and the like. The thickness of the metal reflective layer is usually 0.001 to 10 µm, preferably 0.01 to 5 µm. The thickness of the protective layer is usually 2 to 400 µm, preferably 1.0 to 200 µm.

The optical recording layer, the metal reflective layer, the protective layer, and the other optional layers can be provided by ordinary coating techniques, such as spin coating, dipping, air knife coating, curtain coating, flow coating, roller coating, wire bar coating, Mayer bar coating, knife coating, screen printing, comma roll coating, silk screen printing, T-die coating, lip die coating, slide coating, slit reverse coating, gravure coating, and extrusion coating using a hopper (see U.S. Pat. No. 2,681,294). Two or more layers can be formed by simultaneous coating. For the details of simultaneous coating techniques, reference can be made in U.S. Pat. Nos. 2,761,791, 2,941,898, 3,508,947, and 3,526,528, and Harasaki Yuji, *Coating Kogaku*, Asakura Shoten, 1973, 253.

The present invention will now be illustrated in more detail by way of Examples and Comparative Example, but it should be understood that the invention is not construed as being limited thereto.

Examples 1 to 6 illustrate production of an optical recording medium of the invention using the heterocyclic compound of the invention. Comparative Example 1 illustrates production of a comparative optical recording medium using a heterocyclic compound having a different structure from that of the heterocyclic compound of the invention.

In Evaluation Examples 1-1 to 1-6 the UV absorption spectrum of the optical recording medium Nos. 1 to 6 obtained in Examples 1 to 6 was measured to evaluate suitability to writing/reading with a short wavelength laser. The results obtained are shown in Table 1 below.

In Evaluation Examples 2-1 to 2-6 and Comparative Evaluation Example 2-1 the light resistance of the optical recording medium Nos. 1 to 6 obtained in Examples 1 to 6 and the optical recording medium No. 7 obtained in Comparative Example 1 was evaluated by measuring absorbance retention at the maximum absorption wavelength ($\lambda_{max}$) of the UV absorption spectrum. The results obtained are shown in Table 2 below.

Examples 1 to 6

Each of heterocyclic compound Nos. 1 to 3 was dissolved in 2,2,3,3-tetrafluoropropanol in a concentration of 1.0% by mass with or without a quencher compound to prepare a solution as an optical recording material. A titanium chelate compound T-50 (available from Nippon Soda Co., Ltd.) was applied to a polycarbonate disk substrate having a diameter of 12 cm, followed by hydrolysis to form a primer layer having a thickness of 0.01 µm. The 2,2,3,3-tetrafluoropropanol solution was applied onto the primer layer by spin coating to form an optical recording layer having a thickness of 100 nm. The resulting optical recording media were designated optical recording medium Nos. 1 to 6.

Comparative Example 1

A comparative optical recording material was prepared in the same manner as in Examples 1 to 6 except for using comparative compound No. 1 shown below as a heterocyclic compound. An optical recording medium (designated No. 7) was made using the resulting optical recording material in the same manner as in Examples.

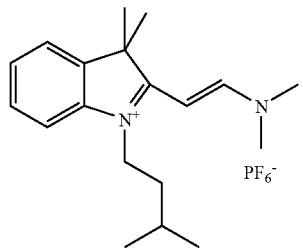

Comparative Compound No. 1

Evaluation Examples 1-1 to 1-6

The UV absorption spectrum of optical recording medium Nos. 1 to 6 obtained in Examples 1 to 6 was measured. The results are shown in Table 1. The quencher compounds used are compound α and compound β shown below.

TABLE 1

| Evaluation Example No. | Heterocyclic Compound No. | Quencher Compound | Optical Recording Medium No. | $\lambda_{max}$ (nm) |
|---|---|---|---|---|
| 1-1 | 1 | — | 1 | 373.0 |
| 1-2 | 2 | — | 2 | 370.0 |
| 1-3 | 3 | — | 3 | 380.0, 564.0* |
| 1-4 | 1 | Compound α | 4 | 372.0 |
| 1-5 | 2 | Compound α | 5 | 370.0 |
| 1-6 | 2 | Compound β | 6 | 372.0 |

*The absorption by the quencher anion moiety.

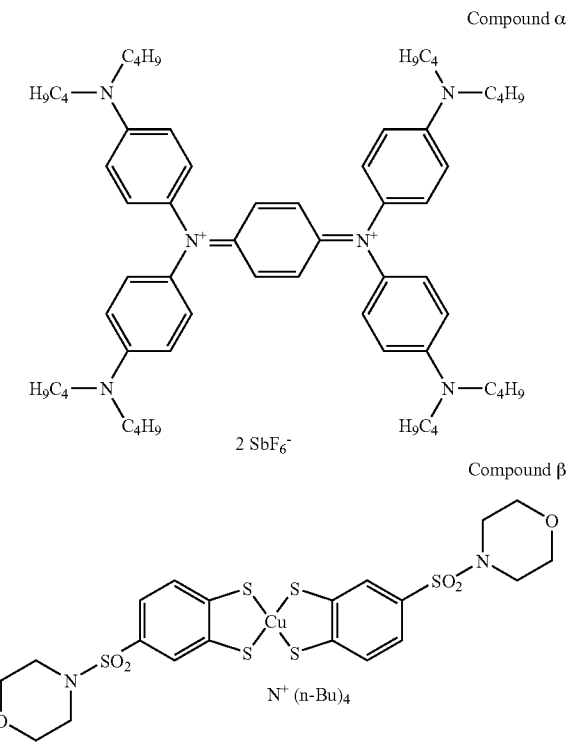

Compound α

Compound β

As is apparent from the results in Table 1, optical recording medium Nos. 1 to 6 having the optical recording layer formed of the optical recording material of the invention show an absorption maximum at a $\lambda_{max}$ of around 340 to 450 nm in their UV absorption spectra. They were thus proved to be suited to write on with a laser beam of 380 to 420 nm.

Evaluation Examples 2-1 to 2-6 And Comparative Evaluation Example 2-1

Optical recording medium Nos. 1 to 6 obtained in Examples 1 to 6 and comparative optical recording medium No. 7 obtained in Comparative Example 1 were tested for light resistance as follows. The optical recording medium was irradiated with light of 55000 lux for 24 hours and 48 hours. The absorbance retention at $\lambda_{max}$ in the UV absorption spectrum after the irradiation was obtained. The results are shown in Table 2.

TABLE 2

| Evaluation Example No. | Heterocyclic Compound No. | Quencher Compound | Optical Recording Medium No. | Absorbance Retention (%) 24 hrs | 48 hrs |
|---|---|---|---|---|---|
| 2-1 | 1 | — | 1 | 100 | 97.0 |
| 2-2 | 2 | — | 2 | 61.6 | 27.8 |
| 2-3 | 3 | — | 3 | 99.7 | 97.8 |
| 2-4 | 1 | compound α | 4 | 98.4 | 96.7 |
| 2-5 | 2 | compound α | 5 | 97.8 | 74.4 |
| 2-6 | 2 | compound β | 6 | 78.6 | 37.9 |
| Compara. 2-1 | compara. compound No. 1 | — | 7 | 34.4 | 15.3 |

As is apparent form Table 2 that the optical recording media of the present invention had a high absorbance retention after 24-hour and 48-hour irradiation, proving resistant to light. In contrast, the comparative optical recording medium having an optical recording layer formed of an optical recording material containing the comparative compound shows a reduction in absorbance retention after 24 hour irradiation and a remarkable reduction in absorbance retention after 48 hour irradiation, indicating poor light resistance.

Industrial Applicability

The present invention provides a light-resistant optical recording medium for short wavelength writing light.

The invention claimed is:

1. An optical recording medium comprising a substrate and an optical recording layer on the substrate, the optical recording layer being formed of an optical recording material comprising at least one heterocyclic compound represented by general formula (I):

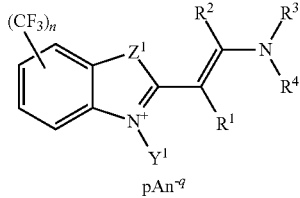

wherein,
$Z^1$ represents an oxygen atom, a sulfur atom, a selenium atom, —$CR^5R^6$—, —NH—, or —NR;
$R^5$ and $R^6$ each independently represent an alkyl group having 1 to 8 carbon atoms, an aryl group having 6 to 20 carbon atoms, an aralkyl group having 7 to 20 carbon atoms, or a substituent represented by general formula (II), or $R^5$ and $R^6$ are taken together to form a ring;

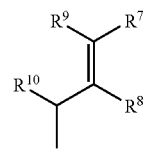

wherein $R^7$, $R^8$, $R^9$, and $R^{10}$ each independently represent a hydrogen atom, a halogen atom, or an alkyl group having 1 to 4 carbon atoms, a methylene moiety in the alkyl group having 1 to 4 carbon atoms may be replaced with —O— or —CO—, and $R^7$ and $R^8$ may be taken together to form a ring;
R represents a hydrogen atom, an alkyl group having 1 to 8 carbon atoms, an aryl group having 6 to 20 carbon atoms, or an aralkyl group having 7 to 20 carbon atoms;
$R^1$ and $R^2$ each independently represent a hydrogen atom, a halogen atom, a cyano group, an alkyl group having 1 to 8 carbon atoms, or an aralkyl group having 7 to 20 carbon atoms;
$R^3$ and $R^4$ each independently represent an alkyl group having 1 to 8 carbon atoms or an aryl group having 6 to 20 carbon atoms, or $R^3$ and $R^4$ are taken together to form a heterocyclic ring having no multiple bond;
$Y^1$ represents a hydrogen atom, an alkyl group having 1 to 8 carbon atoms, an aryl group having 6 to 20 carbon atoms, or an aralkyl group having 7 to 20 carbon atoms, wherein the alkyl group having 1 to 8 carbon atoms as represented by $R^1$, $R^2$, $R^3$, $R^4$, $R^5$, $R^6$, or R, the aryl group having 6 to 20 carbon atoms as represented by $R^3$, $R^4$, $R^5$, $R^6$, R, or $Y^1$, and the aralkyl group having 7 to 20 carbon atoms as represented by $R^1$, $R^2$, $R^5$, $R^6$, R, or $Y^1$ may have a substituent, and a methylene moiety of the alkyl group having 1 to 8 carbon atoms as represented by $R^1$, $R^2$, $R^3$, $R^4$, $R^5$, $R^6$, or R may be replaced with —O— or —CH═CH—;
$An^{q-}$ represents a q-valent anion, wherein q represents 1 or 2, p represents a number necessary to neutralize the electric charge of the heterocyclic compound, and n represents a number of 1 to 4.

2. The optical recording medium according to claim 1, wherein the heterocyclic compound is present in the amount of 0.1% to 10% by mass based on the optical recording material.

3. The optical recording medium according to claim 1, wherein the optical recording material further comprises a quencher compound.

4. The optical recording medium according to claim 3, wherein the quencher compound is a diimmonium compound represented by general formula (IX):

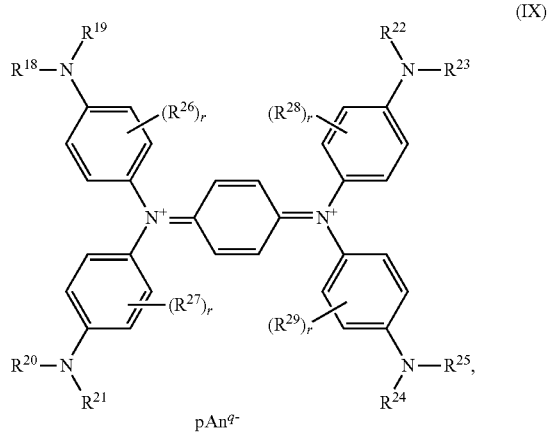

wherein $R^{18}$, $R^{19}$, $R^{20}$, $R^{21}$, $R^{22}$, $R^{23}$, $R^{24}$, and $R^{25}$ each independently represent a hydrogen atom or a substituted or unsubstituted alkyl group having 1 to 8 carbon atoms;

$R^{26}$, $R^{27}$, $R^{28}$, and $R^{29}$ each independently represent a hydrogen atom, a halogen atom, a substituted or unsubstituted alkyl group having 1 to 8 carbon atoms, or a substituted or unsubstituted amino group;

a methylene moiety of the alkyl group represented by $R^{18\,i}$, $R^{19}$, $R^{20}$, $R^{21}$, $R^{22}$, $R^{23}$, $R^{24}$, $R^{25}$, $R^{26}$, $R^{27}$, $R^{28}$, and $R^{29}$ may be replaced with —O— or —CH═CH—;

r represents a number of 1 to 4; and $An^{q-}$, p, and q are as defined for general formula (I).

5. The optical recording medium according to claim 3, wherein the quencher compound is a metal complex represented by general formula (X):

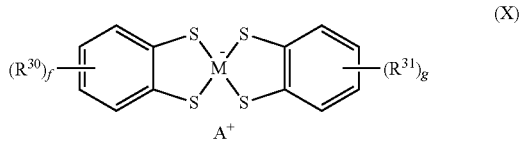

(X)

wherein M represents a nickel atom, a cobalt atom, or a copper atom;

$R^{30}$ and $R^{31}$ each represent a halogen atom, an alkyl group having 1 to 8 carbon atoms, an aryl group having 6 to 30 carbon atoms, or —SO-G;

G represents an alkyl group, a halogen-substituted or unsubstituted aryl group, a dialkylamino group, a diarylamino group, a piperidino group, or a morpholino group;

A represents $N^+(n\text{-Bu})_4$; and f and g each independently represent a number of 0 to 4.

6. An optical recording medium comprising a substrate and an optical recording layer on the substrate, the optical recording layer being formed of an optical recording material comprising at least one heterocyclic compound represented by general formula (III):

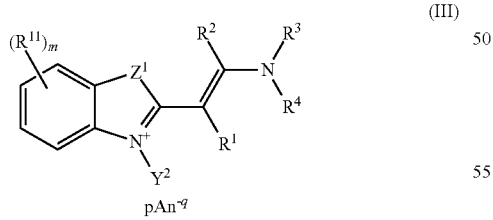

(III)

wherein, $Z^1$ represents an oxygen atom, a sulfur atom, a selenium atom, —$CR^5R^6$—, —NH—, or —NR;

$R^5$ and $R^6$ each independently represent an alkyl group having 1 to 8 carbon atoms, an aryl group having 6 to 20 carbon atoms, an aralkyl group having 7 to 20 carbon atoms, or a substituent represented by general formula (II), or $R^5$ and $R^6$ are taken together to form a ring;

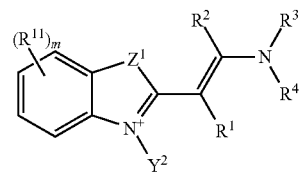

(III)

wherein, $R^7$, $R^8$, $R^9$, and $R^{10}$ each independently represent a hydrogen atom, a halogen atom, or an alkyl group having 1 to 4 carbon atoms, a methylene moiety in the alkyl group having 1 to 4 carbon atoms may be replaced with —O— or —CO—, and $R^7$ and $R^8$ may be taken together to form a ring;

R represents a hydrogen atom, an alkyl group having 1 to 8 carbon atoms, an aryl group having 6 to 20 carbon atoms, or an aralkyl group having 7 to 20 carbon atoms;

$R^1$ represents a hydrogen atom, a halogen atom, a cyano group, an alkyl group having 1 to 8 carbon atoms, or an aralkyl group having 7 to 20 carbon atoms;

$R^2$ represents a hydrogen atom, a halogen atom, a cyano group, an alkyl group having 1 to 8 carbon atoms, benzyl, phenethyl, 2-phenylpropane, diphenylmethyl, triphenylmethyl, styryl or cinnamyl;

$R^3$ and $R^4$ each independently represent an alkyl group having 1 to 8 carbon atoms or an aryl group having 6 to 20 carbon atoms, or $R^3$ and $R^4$ are taken together to form a heterocyclic ring having no multiple bond;

$An^{q-}$ represents a q-valent anion, wherein q represents 1 or 2, p represents a number necessary to neutralize the electric charge of the heterocyclic compound, and n represents a number of 1 to 4;

$R^{11}$ represents a hydrogen atom, an alkyl group having 1 to 8 carbon atoms, a halogen atom, a nitro group, a cyano group, or an amino group;

adjacent $R^3$ and $R^4$ may be taken together to form a ring;

m represents a number of 1 to 4; and $Y^2$ represents a substituent represented by general formula (IV):

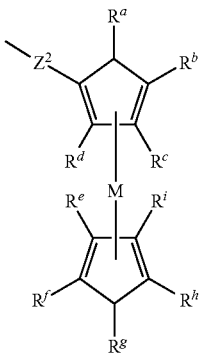

(IV)

wherein $R^a$, $R^b$, $R^c$, $R^d$, $R^e$, $R^f$, $R^g$, $R^h$, and $R^i$ each independently represent a hydrogen atom, a hydroxyl group, or an alkyl group having 1 to 4 carbon atoms, and a methylene moiety of said alkyl group having 1 to 4 carbon atoms may be replaced with —O— or —CO—;

$z^2$ represents a single bond or a substituted or unsubstituted alkylene group having 1 to 8 carbon atoms and a methylene moiety of said alkylene group may be replaced with —O—, —S—, —CO—, —COO—, —OCO—, —SO$_2$—, —NH—, —CONH—, —NHCO—, —N=CH—, or —CH=CH—; and M represents a metal atom.

7. The optical recording medium according to claim 6, wherein the heterocyclic compound is present in the amount of 0.1% to 10% by mass based on the optical recording material.

8. The optical recording medium according to claim 6, wherein the optical recording material further comprises a quencher compound.

* * * * *